Feb. 13, 1923.  1,444,927
A. V. LEGGO
FURNACE FOR ROASTING ORES AND SUCH LIKE OPERATIONS
Filed May 18, 1922   6 sheets-sheet 1

Inventor
Arthur Victor Leggo
By
Pennie, Davis, Marvin and Edmonds
Attorneys

Feb. 13, 1923.  1,444,927
A. V. LEGGO
FURNACE FOR ROASTING ORES AND SUCH LIKE OPERATIONS
Filed May 18, 1922   6 sheets-sheet 4

Inventor
Arthur Victor Leggo

By
Pennie, Davis, ———
Attorneys

Feb. 13, 1923. 1,444,927
A. V. LEGGO
FURNACE FOR ROASTING ORES AND SUCH LIKE OPERATIONS
Filed May 18, 1922 6 sheets-sheet 5

Inventor
Arthur Victor Leggo
By
Pennie, Davis, Marvin & Edmond
Attorneys

Feb. 13, 1923.

A. V. LEGGO 1,444,927

FURNACE FOR ROASTING ORES AND SUCH LIKE OPERATIONS

Filed May 18, 1922 6 sheets-sheet 6

Patented Feb. 13, 1923.

1,444,927

UNITED STATES PATENT OFFICE.

ARTHUR VICTOR LEGGO, OF MELBOURNE, VICTORIA, AUSTRALIA.

FURNACE FOR ROASTING ORES AND SUCH LIKE OPERATIONS.

Application filed May 18, 1922. Serial No. 561,312.

*To all whom it may concern:*

Be it known that ARTHUR VICTOR LEGGO, subject of the King of Great Britain, residing at 497 Collins Street, Melbourne, in the State of Victoria, Commonwealth of Australia, has invented certain new and useful Improvements in Furnaces for Roasting Ores and Such like Operations, of which the following is a specification.

This invention relates to an improved furnace for roasting ores and such like operations and refers more especially to furnaces having superimposed circular or approximately circular hearths and adapted for roasting, sulphating, deyhdrating or such like operations.

Superimposed circular hearth furnaces having rotating rabbles have hitherto been constructed with one central column carrying the supporting arms for the rabble teeth which serve to move the ore under treatment on one hearth from the centre to the periphery and vice versa on the next hearth and so on in a zig-zag manner radially through the furnace, at the same time the rabbles serve to continuously expose fresh surfaces of the ore particles to the furnace gases.

In order to increase the size of the roasting units with this type of furnace, it has been the practice to increase the diameter and in some cases the number of the hearths but it has been found that there is an economic limit beyond which this increase should not be carried.

For example, any increase in the diameter and capacity of the furnace involves a corresponding increase in the size of the column and the size and length of the rabble arms. These increases require a considerable increase in the height of each roasting chamber (especially when provision is made for circulation of a cooling medium through the rabble arms). Now it is recognized in metallurgical practice that is generally desirable that the roasting chambers should be as low as possible in order to conserve heat and to ensure that the ore particles come into intimate contact with the furnace gases and this is especially important when the gases are to be utilized for the manufacture of sulphuric acid and other industrial purposes.

Furthermore, when arms are used through which a cooling medium is circulated, they have certain pronounced metalurigical and mechanical disadvantages; these are, that in many operations it is undesirable to remove heat from some of the stages of the roast (even if the heat so removed can be returned to the furnace elsewhere) and the complex arrangements necessary to detachably fix the arms to the column whilst at the same time maintaining the circulation of the cooling medium.

A disadvantage incidental to the use of long rabble arms in addition to their unwieldiness is that the relatively high velocity of the outer end of the arms leads to an uneven distribution of ore over the hearths.

The annular area which contains the ports on an outward rabbled hearth is comparatively bare under operating conditions and therefore inefficient; whilst with certain ores (notably those containing zinc or lead) any ore left unstirred beneath the teeth will set into hard cakes if left exposed to the furnace gases. The removal of these cakes involves an arduous operation and in many cases stoppage of the furnace.

Another disadvantage incidental to an increase in the size and capacity of circular furnaces of this type is in connection with the circulation of gases for which large port area must be provided with consequent reduction of active hearth area.

The object of the present invention is to provide an improved construction of furnace of the above mentioned type (that is to say having superimposed circular or approximately circular hearths) whereby greatly increased size and capacity may be secured in the furnace without incurring the above mentioned disadvantages whilst at the same time more efficient roasting and such like operations may be effected.

I accomplish the above mentioned object by providing a circular (or approximately circular) furnace having superimposed hearths provided with a plurality of vertical rabble shafts disposed symmetrically about the centre of the said hearths and fitted with rabble arms of a length substantially less than the radius of the said hearths and adapted to move in overlapping paths whereby the material on the hearths will be effectually rabbled and moved progressively through the furnace.

The arrangement of the rabble shafts and arms is such that certain portions of the hearths formed on two sides by the orbits of the rabbles and on the other side by the inner face of the outer wall of the furnace are outside the area covered by the rabbles and are utilized to accommodate drop holes and (or) flues. These portions are hereinafter referred to for purposes of definition as "cusp shaped spaces" or "cusps." This arrangement moreover enables a furnace to be so constructed as to obviate many of the disadvantages above referred to and to be readily adapted to the most exacting requirements of any particular kind or condition or material to be treated.

A salient advantage of this arrangement is that it permits of the use of short rabble arms in a large diameter furnace which rabble arms can be made of small vertical section and in turn permits of the roasting chambers being built sufficiently shallow to be most efficient metallurgically.

Moreover, such short arms when constructed of special material do not require cooling and consequently the mechanical and metallurgical disadvantages incidental to the employment of cooled arms are obviated.

The symmetrical arrangement of the rabble shafts fitted with short arms about the centre of the furnace enables such central portion of the furnace to be utilized for accommodating a stationary central column adaptable for the transference of air or gases from one portion to another or for the purpose of preheating air for delivery to one or more roasting chambers of the furnace, or for supplying cooling air when required.

In order that the invention may be readily understood reference will now be had to the accompanying sheets of explanatory drawings wherein—

Figure 9 is a diagrammatic view of a hearth of the furnace provided with additional gas ports independent of the combined ore and gas ports.

Figure 9$^a$ is a sectional view of part of Figure 9 taken on the dotted line 9$^a$—9$^a$.

Figure 10 is a diagrammatic view of a furnace in plan provided with three rabble shafts and shows half an inward and half of an outward rabbled hearth.

In these drawings the numeral 30 designates the furnace casing or shell which preferably is made circular in form and has a series of superimposed hearths 31 over which the material under treatment is moved by mechanically operated rabbles adapted to stir the material so as to continuously expose all particles of it to the action of the gases in the furnace.

The rabbling mechanism comprises a plurality of rabble shafts 32 which pass through all the hearths and are symmetrically arranged around the centre of the furnace and provided with short rabble arms 33 of approved construction.

It will be obvious from the following description of different arrangements of rabble shafts that to obtain the advantages incidental to a furnace constructed in accordance with this invention at least three rabble shafts must be arranged symmetrically about the centre of the furnace.

The rabble shafts 32 are driven by approved gearing as 32$^a$ from below or above the furnace, as preferred, and the material to be treated is delivered into the top and discharged from the bottom of the furnace in any approved way.

The arms 33 on the rabble shafts are so arranged that they move in more or less overlapping paths and have teeth 34 (see Fig. 3) attached thereto which serve to stir the ore and to move it over the hearths.

Figure 1:
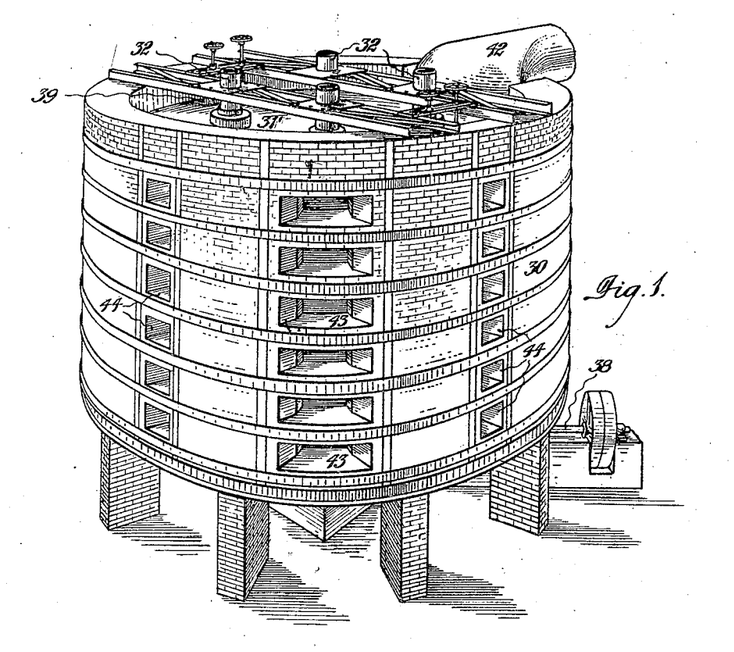
Figure 1 is a view in perspective of a furnace constructed in accordance with the invention.
Figure 2:
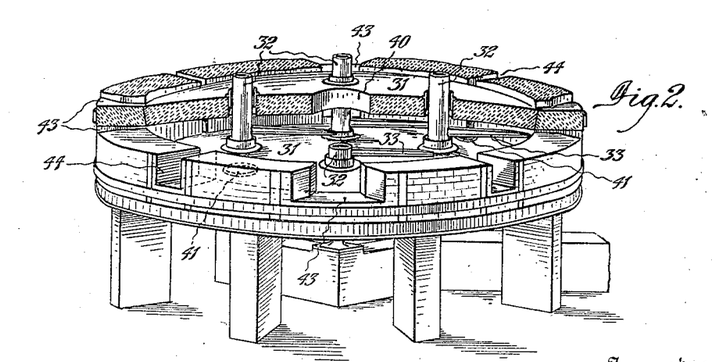
Figure 2 is a view in perspective of the lower part of the furnace and shows part of the internal construction thereof. The rabble arms are shown without teeth for convenience of illustration.
Figure 3:
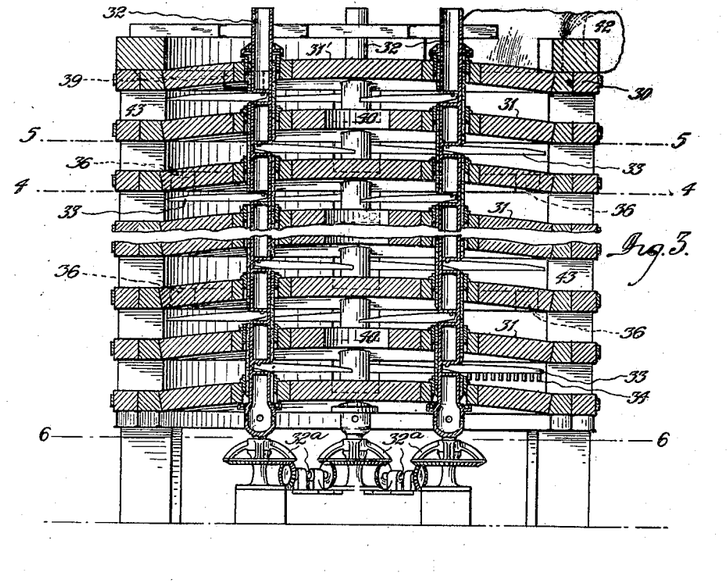
Figure 3 is a view in sectional elevation of the furnace portion being shown broken away for convenience of illustration.
Figure 4:
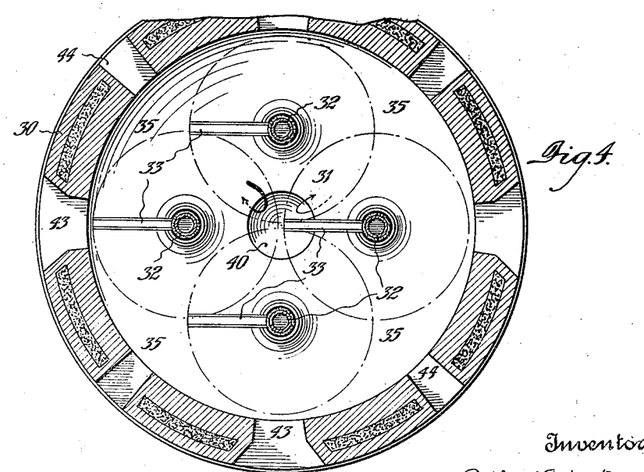
Figure 4 is a view in sectional plan taken on the dotted line 4—4 of Figure 3.
Figure 5:
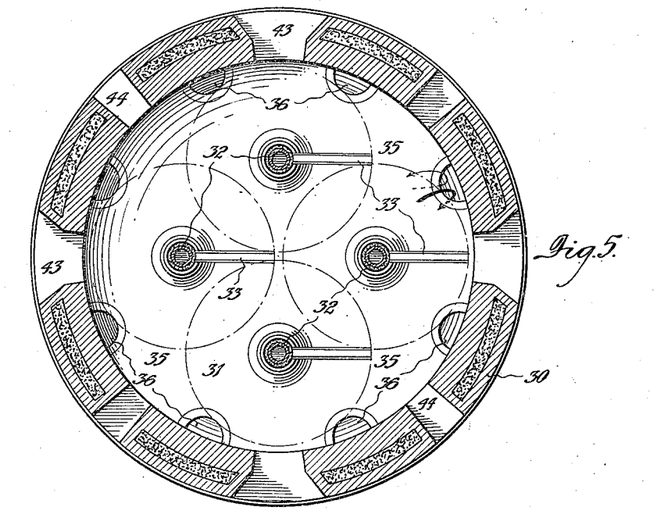
Figure 5 is a view in sectional plan taken on the dotted line 5—5 of Figure 3.
Figure 6:
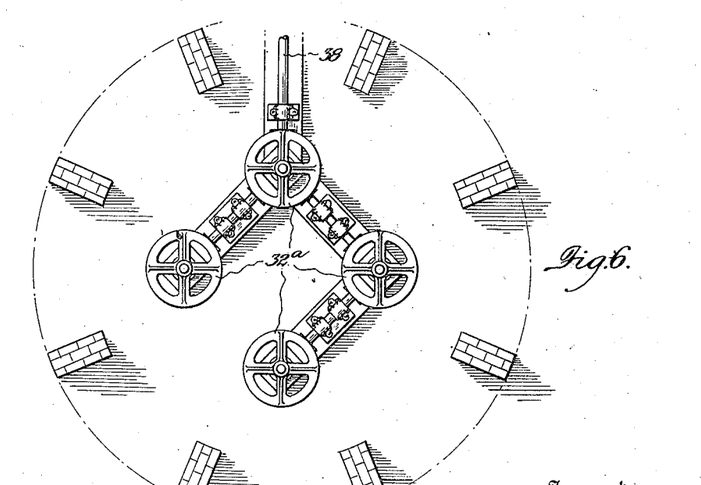
Figure 6 is a view in sectional plan taken on the dotted line 6—6 of Figure 3.

The rabble shafts 32 may be lagged as shown in Figure 3 with suitable refractory material and provided with tilting arms 33 which are locked in the shaft by their own weight. The shaft and arms employed in the furnace are more less identical with those used in "long hearth" or "straight line" furnaces and are small in size as compared with those ordinarily provided with superimposed circular hearth furnaces of equal diameter.

If for any reasons it may be considered desirable to use arms cooled by a circulating fluid (such as air or water), they may be of any well known form.

The "cusps" 35 of the hearths which lie outside the orbits of the rabbles and inside the outer wall 30 of the furnace are used to accommodate ports or passages 36 through which the gases and ore pass from one roasting chamber to another. The arrangement of the ports 36 as above described provides that whilst the necessary area for the passage of the gases is furnished the number and area of the ports by which the ore passes from hearth to hearth may be varied as required, without reducing the working area of the hearths.

Furthermore the arrangement of the ports for the passage of the ore within the said "cusps" enables the said ports to be disposed mainly outside the orbits of the rabbles. When the ports are located within the orbits of the rabbles an uneven distribution of ore on the hearth is occasioned due to the thinning of the bed of ore by the discharge through the said ports. The arrangement of the ports in accordance with this invention ensures an even bed of ore, increases the roasting capacity of the furnace and prevents the formation of accretions or hard cakes of ore on the hearths.

In the furnace illustrated in Figures 1 to 6 of the drawings four rabble shafts are shown passing vertically through all the hearths and these rabble shafts are driven from beneath the furnace by gearing 32ª from a driving shaft 38.

The top 31' of the furnace can be used as a drying hearth for the material to be treated which is passed by rabbling mechanism or rakes (not shown) on the rabble shafts across the drier hearth to feed inlets 39 at the sides thereof. The ore delivered to the top hearth 31 (whether from the drying hearth or from a superposed hopper) is moved inwardly by the rabbling mechanism to a central port 40 down which it falls to the centre of the second hearth. The rabbling mechanism operating over the second hearth moves the ore outwardly to the ports 36 down which it falls on to the outer part of the third hearth and so on over all the hearths of the furnace, or alternatively the ore may be fed to the centre of the top hearth and be moved outwardly thereover and inwards on the next hearth and so on through the furnace.

It will be obvious to one skilled in the art that the above mentioned method of rabbling will effectually stir the ore in the furnace and expose it to the furnace gases and at the same time move it progressively through the furnace. The ore is discharged through outlet ports 41 in the bottom hearth into trucks or other means for receiving and conveying it away from the furnace in any well known way.

The gases ascend and pass through the centre ports 40 in inwardly rabbled hearths and through the ports 36 in outward rabbled hearths in opposite direction to the movement of the ore. An off take pipe 42 is provided at the top of the furnace for leading off the gases to a desired point.

The offtake pipe 42 is located in one of the "cusps" of the cover hearth 31' and when placed in this position its intake area can be made equal to or approximately equal to the total area of the gas ports without having to encroach on the rabbled portions of the cover hearth thereby enabling the said cover hearth to be used for drying the feed. A further advantage incidental to locating the offtake pipe 42 in the position above described is that its intake end is of compact form which would not otherwise be possible if the offtake led from the narrow space left between the ore and the arch above around the periphery of the top hearth 31'.

The arms preferably project alternately from opposite sides of the shafts in their order upwards and all the shafts can be arranged to rotate in the same direction or some of the shafts can be rotated in one direction and the other shafts in the reverse direction.

The plurality of symmetrically arranged rabbles move the ore through the furnace so as to allow it to receive variations in treatment as required. All the operations in the furnace are conducted without interruption so that whilst the products of the reaction pass continuously through the furnace the conditions of each stage of the treatment in the furnace remain constant and continuity of operation and uniformity of product is ensured.

The sides of the furnace directly opposite the rabble shafts are provided with openings 43 through which the arms 33 are introduced into the furnace for attachment to the rabble shafts. These openings 43 permit of accessibility to the interior of each of the roasting chambers for effecting repairs and for other purposes and they are normally covered in any well known way.

Inspection ports 44 are formed in the sides of the furnace wall at points intermediate the openings 43 to permit a ready access being had to the ore and gas ports located in the "cusps" on the hearths and these ports are filled up with loose brick-work when the conservation of heat is desired or otherwise covered in any suitable way.

A fire-box or fire-boxes may be provided for supplying heat from an outside source when required but as fire-boxes of different designs are commonly used with circular furnaces and form no part of this invention they have been omitted from the drawings for convenience of illustration.

In lieu of arranging the ports 36 together with a central port 40 as above described so as to pass the ore inwardly to and outwardly from the centre of successive hearths the central port 40 can be dispensed with and the ports 36 can be arranged so that the ore and gas will be passed diametrically over all the hearths.

Figure 7:
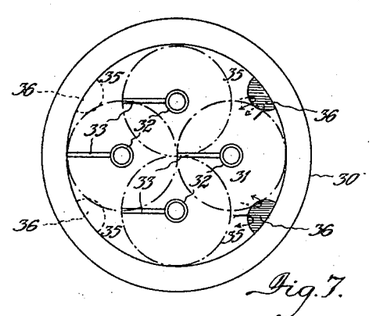
Figures 7 and 8 are diagrammatic views of two succeeding hearths of a furnace and show another method of arranging the ore and gas ports to obtain a different circulation of the ore and gases through the furnace.
Figure 8:
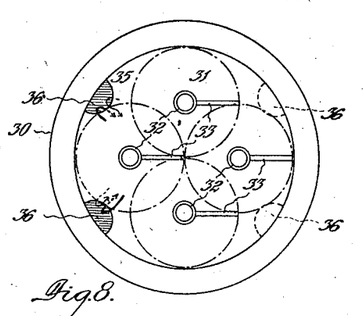
Figures 9, 9A, 10:
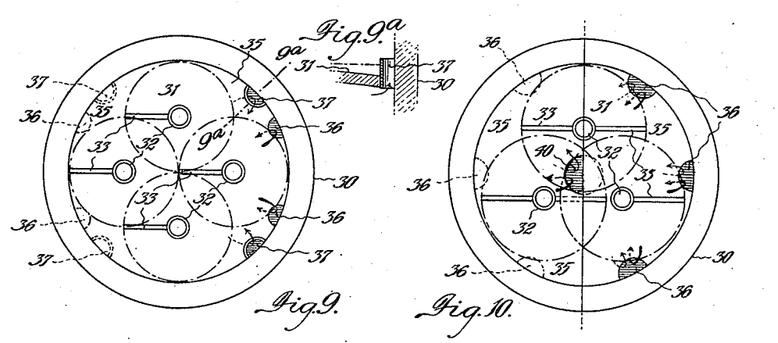

This arrangement of the circulation of the ore and gas is illustrated diagrammatically in Figures 7, 8 and 9 which views are intended to represent horizontal sections of a four shaft circular furnace taken over successive hearths. In this arrangement the gas and ore ports 36 are formed in the "cusps" on one side of alternate hearths and on the opposite sides of intermediate hearths. That is to say each hearth is provided with ports on one side only and in the next hearth the said ports are arranged on the opposite side of the furnace. When the ore and gas ports are arranged as above described the rabbles pass the ore diametrically across the hearths and in a zig-zag manner through the furnace and the gases pass in a reverse direction.

The ports 36 or drop holes are so arranged that the ore passes down only such ports as will insure that, considering the direction of movement of the rabbles, there will be no likelihood of any considerable proportion of the ore remaining too short a time on a hearth before passing to the next hearth beneath. Extra gas passages down which the ore will not pass may be provided in the "cusps".

In those instances where extra passages are required for the passage of the gases apart from the ore separate gas flues 37 are provided in the "cusps" away from the orbits of the rabbles and the said flues are so positioned that no ore will pass through them (see Figures 9 and 9ᵃ of the drawings).

When separate gas flues are provided they are preferably located inside the "cusps" well away from the rabble orbits and they can be extended upwardly beyond the normal level of the ore. The object in locating the upper ends of the gas flues 37 above the level of the ore is to positively prevent any ore entering and descending the same which would interfere with the normal path of the ore through the furnace.

When the gas flues 37 are located entirely outside the orbits of the rabbles 33 very little of the ore will pass down the said gas flues even when they do not extend above the normal level of the ore.

It will be obvious that the novel arrangement of a plurality of shafts in a circular furnace having superimposed hearths will suggest a number of modifications to one skilled in the art. In the diagrammatic views illustrated in Figures 10 to 18 I have shown a number of such modifications though it is to be understood that I do not confine myself thereto.

In these diagrammatic views the path of the ore is indicated by thick arrows and the path taken by the gases is indicated by faint arrows.

Figure 11:
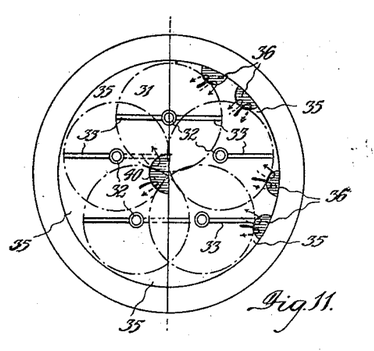
Figure 11 is a view similar to Figure 10 showing five rabble shafts in the furnace.

Figures 10 and 11 of the drawings are diagrammatic views representing sectional views of furnaces provided respectively with three and five symmetrically arranged shafts, which rabble the ore in a zig-zag manner.

Figure 12:
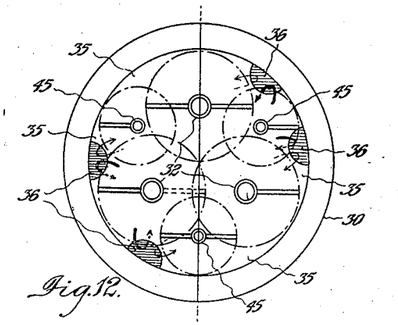
Figure 12 is a view similar to Figure 10 showing six rabble shafts in the furnace, the alternate shafts carrying shorter arms than those operating on both sides thereof.

In Figure 12 is shown a furnace provided with six rabble shafts the alternate shafts 45 being of smaller diameter and fitted with shorter arms than the other shafts 32.

In this view the gas and ore ports 36 are arranged so that the ore and gas will be passed diametrally over the hearths but it will be obvious that the ports can be arranged as shown in Figures 2 to 5 of the drawings in which case the ore and gas will be moved radially over the hearths and in a zig-zag manner from the centre to the outside of alternate hearths and from the outside to the centre of the intermediate hearths.

Figure 13:
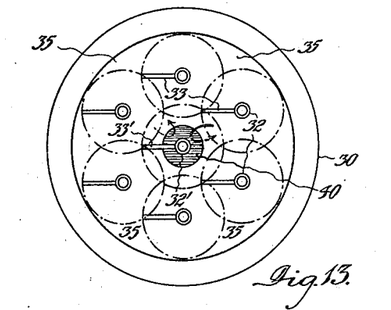
Figure 13 is a diagrammatic view of an inward rabbled hearth of a furnace having a plurality of rabbles placed symmetrically around a central rabble shaft.
Figure 14:
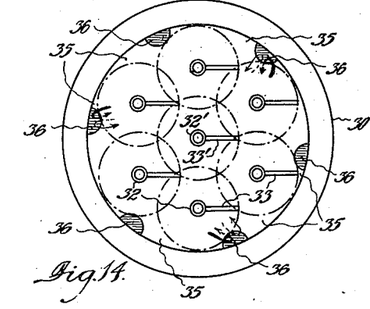
Figure 14 is a view similar to Figure 13 showing an outward rabbled hearth.

In Figures 13 and 14 is shown another arrangement of six outer rabble shafts surrounding a central rabble shaft 32′ and the orbits of the arms on the said outer shafts are adapted to overlap each other and also overlap the orbits of the arms 33′ on the central shaft. The ore and gas ports in the hearths are disposed so as to cause the ore and gas to be moved radially thereover from the centre to the outside of the furnace on alternate hearths and vice-versa on intermediate hearths.

Figure 15:
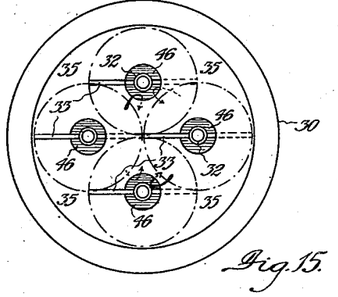
Figures 15 and 16 are diagrammatic views of two succeeding hearths of a furnace in plan, showing a further arrangement of the ore and gas ports whereby a third method of circulating the ore and gases is obtained.
Figure 16:
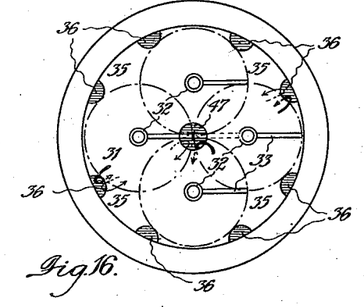

In Figures 15 and 16 is shown a different arrangement of the ore and gas ports in the hearths. In this instance the ore is moved outwardly from each rabble shaft on alternate hearths and inwardly toward each rabble shaft on the intermediate hearths.

In this method of passing the gas and ore through the furnace gas and ore ports 46 are arranged around the shafts on each alternate hearth and in the other hearths ports 36 and 47 are arranged respectively in the "cusps" and at the centre of the said hearths.

The amount of ore transferred from the area commanded by one rabble to the areas commanded by the adjacent rabbles and vice-versa will approximately balance and this intermixing of the ore will ensure even conditions on each hearth and a homogeneous furnace product.

In Figures 15 and 16 four rabble shafts 32 are shown but it will be obvious that three or a greater number than four can be used and the ports would then be located around all the shafts in each alternate hearth.

In the foregoing specification I have described different arrangements of the gas and ore ports in the hearths of the furnace whereby the ore will be passed across the hearths radially or diametrically or in a direction radial to each of the rabble shafts.

It will, however, be obvious that one furnace can be constructed with ports so arranged in the hearths that any one of the above-mentioned alternative methods of gas and ore movement may be used and a change from one to another can be readily effected.

The above-mentioned construction consists in arranging ports around the periphery and at the centre of alternate hearths and at the centre and around the rabble shafts in the intermediate hearths. Those ports not necessary for the method of rabbling required at the moment are temporarily closed by suitable means and only those ports pertaining to the desired movement of the gas and ore left open.

Those portions of the "cusps" 35 not occupied by gas or ore ports may in certain instances be utilized for the accommodation of flues (not shown) for the vertical transference of gases and (or) air.

In a practical application of the invention the number and arrangement of the rabble shafts will depend upon the size of the furnace and also upon whether the central part of the furnace is to be used for accommodating a central stationary column 49.

Where a central stationary column 49 is not required the preferred embodiment of this invention comprises a furnace having four rabble shafts 32 and where a central stationary column is required the preferred embodiment comprises a furnace having six rabbles. In some instances, however, as few as three rabble shafts can be used efficiently and more than six rabble shafts may be used with or without a central stationary column.

Figure 17:
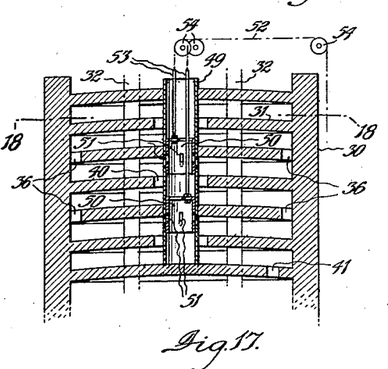
Figure 17 is a view in sectional elevation of part of a furnace having a centrally disposed air circulating column.
Figure 18:
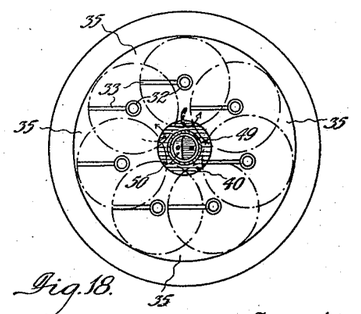
Figure 18 is a diagrammatic view representing a sectional plan of Figure 17 taken on the dotted line 18—18.

When a number of rabble shafts 32 (preferably not less than six) are used with a central stationary column 49 they are arranged symmetrically around the said column as shown in Figures 17 and 18 of the drawings.

This column 49 can be open to the air and means (such as sleeve valves 50 arranged to slide therein) may be employed to control ports 51 leading into the roasting chambers. The sleeve valves 50 are operated to open or close the ports 51 by means of flexible members 52 which are connected to rods 53 on the said valves and pass over suitably disposed guide pulleys 54. In some instances the column 49 may be constructed so that air (or any other gas) may be forced into it and through the ports 51 by a fan or other suitable means.

One or more sleeve valves 50 and ports 51 can be provided (two being shown in the drawings) at that point or those points where it is desired to admit air to the roasting chambers.

Figure 19:
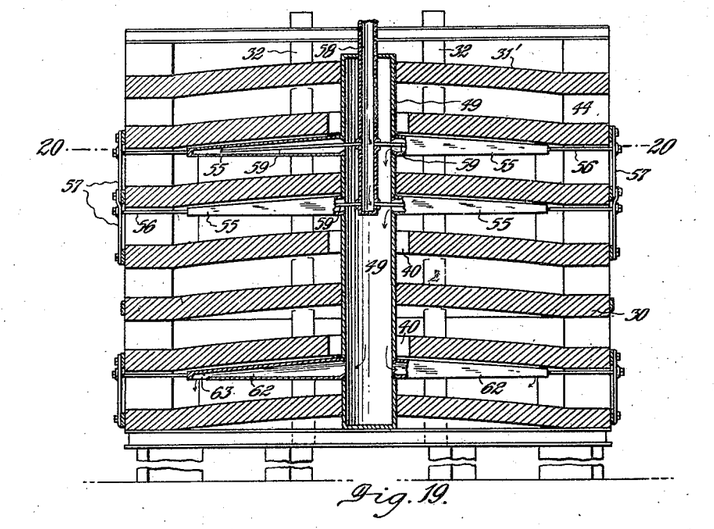
Figure 19 is a view in sectional elevation of a furnace having a central air circulating column provided with radiating muffles.
Figure 20:
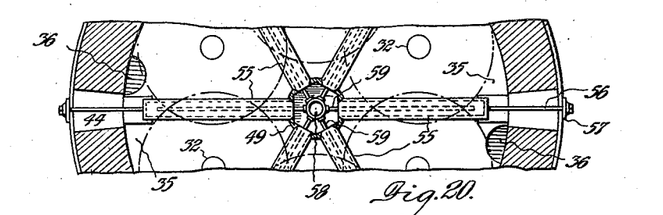
Figure 20 is a view in sectional plan of part of Figure 19 taken on the dotted line 20—20 portions being shown broken away for convenience of illustration.

In Figures 19 and 20 this invention is shown as adapted for a muffle furnace a plurality of shallow muffles 55 being detachably fitted to the central stationary column 49. The muffles are shown applied to a six shaft furnace and are located in the second and third roasting chambers, and close to the underside of the first and second hearths 31 so that the rotating rabble arms will clear them.

The muffles are made of metal in the form of hollow arms and their inner ends are tapered to fit neatly into correspondingly tapered holes formed in the sides of the column 49. A close fitting joint may be effected between the muffles and the column by means of screws or bolts 56 which pass through the walls of the furnace and are supported by removable brackets or bars 57 on the outside thereof or by other suitable means.

A central pipe 58 passes down the stationary columns and distributing pipes 59 conduct the air therefrom to near the outer ends of the muffles 55 whence it returns to the central column 49.

The cool air flowing through the muffles effectually cools the same and extracts a required amount of heat from the roasting chambers. The heated air from the muffles passes down the column 49 and is delivered into the lower part of the furnace through ports in the side of the said column or through hollow arms 62 detachably fitted thereto.

The hollow arms 62 are connected to the column and are supported at their outer ends in the same way as the muffles and the heated air delivered thereto passes out openings 63 near the outer ends thereof. If the lowermost hearth is inwardly rabbled the arms 62 may be dispensed with and the heated air discharged from the column directly into the lowermost hearth.

The muffles 55 preferably are disposed over those parts of the hearths where a double rabbling of the ore is effected as the reaction is more active there and the rabble arms being at a maximum distance from the arch at those points.

When cooling only is required the metal muffles 55 may have their outer ends open to the atmosphere through the walls of the furnace and their inner ends open to the column 49 from which the heated air is withdrawn as required by a fan or by natural draught.

When the muffles are made as above described they can be readily assembled and removed or replaced in sections by operating through the ports 44 in the sides of the furnace.

In lieu of using metal muffles in conjunction with a central column 49 as above described the hearths of the furnace can have muffles therein in which case the top cover 64 of the muffle 65 (see Figures 21 and 22) is preferably made thicker than the lower cover 66 which consists of a false arch suspended or built below the main arch. The stationary column 49 in this case passes vertically through the centre of the hearths and is provided with a longitudinal partition 67 which divides the interior into two compartments 68 and 69.

Figures 21, 22:
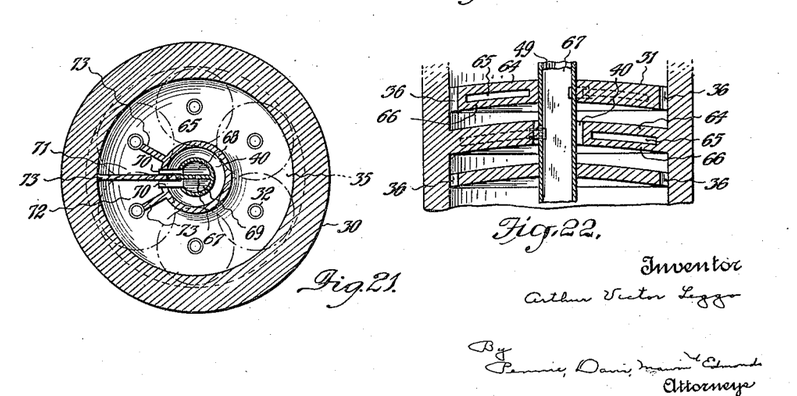
Figure 21 is a view in sectional plan of the furnace showing a modified form of muffle.
Figure 22 is a view in sectional elevation of part of a furnace provided with muffles constructed as shown in Figure 21.

Ports 70 are formed in the column on both sides of and near one edge of the partition 67 and these ports are arranged in line with passages 71 and 72 formed by three vertical partitions 73 arranged radially in the muffles.

The inner ends of the radial partitions 73 abut against the periphery of the central column and the outer ends of the two outside partitions do not extend to the outer wall of the muffles.

When air is admitted to or forced into the compartment 68 it flows therefrom through the passage 71 into the muffles from which it passes by way of the passage 72 and compartment 69 to the outside of the furnace or to one or other of the roasting chambers as desired.

The muffles 65 are preferably of less diameter than the hearths as shown in the drawings though they may be of the same diameter as the hearths if desired.

The central column can be made of metal, brickwork or other suitable material and it may pass right through the furnace or only partially as preferred. When the column passes only through part of the furnace it can be supported by the arches of the roasting chambers or it can be supported at its lower end or suspended from its upper end in any approved way.

The transference of air from one point to another or the introduction of air to the roasting chambers through the centre of the furnace is only possible with circular furnaces having rabbling mechanism constructed and arranged as hereinbefore described.

I claim:

1. A roasting furnace of circular or approximately circular shape having superimposed hearths separate provided with a plurality of vertical rabble shafts disposed symmetrically about the centre of the said hearths and fitted with rabbles of a length substantially less than the radius of the said hearths and adapted to move in overlapping paths above each hearth whereby the material on the hearths will be effectually rabbled and moved progressively from hearth to hearth through the furnace.

2. A roasting furnace of circular or approximately circular shape having superimposed hearths provided with three or more vertical rabble shafts disposed symmetrically about the centre thereof and fitted with rabbles adapted to move in overlapping paths above each hearth and of a length substantially less than the radius of the said hearths, and ports in the hearths for gas and ore so arranged that the ore will be moved in a radial direction over each hearth and in a zig-zag manner progressively through the furnace.

3. A roasting furnace of circular or approximately circular shape having superimposed hearths provided with three or more vertical rabble shafts disposed symmetrically about the centre thereof and fitted with rabbles adapted to move in overlapping paths above each hearth and of a length substantially less than the radius of the said hearth, and ports in the hearths for gas and ore, arranged so that the ore and gas will be moved diametrally, and in opposite directions over consecutive hearths and progressively through the furnace.

4. A roasting furnace of circular or approximately circular shape having superimposed hearths provided with three or more vertical rabble shafts disposed symmetrically about the centre thereof and fitted with rabbles adapted to move in overlapping paths above each hearth and of a length substantially less than the radius of the said hearth, and ports in the hearths for gas and ore so arranged that the ore will be moved radially towards each shaft within the orbits of each of the rabbles on alternate hearths and away from the shafts within the orbits of each of the rabbles on intermediate hearths.

5. A circular or approximately circular furnace having a series of superimposed roasting chambers, a plurality of rabble shafts passing vertically through the furnace and arranged symmetrically about the centre thereof; and fitted with rabbles of a length substantially less than the radius of the hearths, "cusps" on each hearth outside the orbits of the rabbles, gas and ore ports located within the said cusps on alternate hearths, and combined gas and ore ports in the centre of the intermediate hearths.

6. A circular furnace having superimposed hearths provided with a plurality of vertical shafts disposed symmetrically about the centre of the hearths, said rabble shafts being fitted with rabbles of a length substantially less than the radius of the hearths and adapted to move in overlapping paths, cusp shaped spaces on each hearth outside the orbits of the rabbles, ports for gas and ore having their major portions located within the said cusp shaped spaces on one side of alternate hearths, ports for gas and ore having their major portions located within the cusp shaped spaces on the opposite sides of the intermediate hearths and separate gas flues within the same cusps as the gas and ore ports.

7. A circular or approximately circular furnace having superimposed hearths provided with a plurality of shafts passing vertically through and disposed symmetrically about the centre of all the hearths, short rabbles on the shafts of a length substantially less than the radius of the hearths and adapted to move in overlapping paths, ports for ore and gas in the cusps around the outside and also in the centre of each alternate hearth, and ports for ore and gas in the intermediate hearths surrounding the shafts.

8. In a roasting furnace of circular or approximately circular shape provided with superimposed hearths, a rabble shaft passing centrally through the furnace, a plurality of rabble shafts passing vertically through the furnace and disposed symmetrically about the centre shaft, and rabbles fitted to all the shafts of a length substantially less than the radius of the hearths and adapted to move in overlapping paths.

9. In a roasting furnace of circular or approximately circular shape provided with superimposed hearths, a rabble shaft passing centrally through the furnace, a plurality of shafts disposed symmetrically about the centre shaft, rabbles fitted to all the shafts of a length substantially less than the radius of the hearths and adapted to move in overlapping paths, cusps on each hearth, ports for gas and ore having their major portions located within the cusps on alternate hearths, and ports for ore and gas in the centre of the intermediate hearths and surrounding the central rabble shaft.

10. In a circular or approximately circular furnace as claimed in claim 1, a plurality of "cusps" on the hearths near the wall of the furnace and independent gas and ore ports arranged within or having their major portion located within the cusps of the hearths.

11. In a circular or approximately circular furnace as claimed in claim 1, a plurality of cusps on the hearths near the wall of the furnace and combined gas and ore ports arranged within the cusps on the hearths.

12. A circular or approximately circular furnace having a series of superimposed hearths and a plurality of rabble shafts passing vertically through the furnace and arranged symmetrically about the centre thereof, rabble arms fitted to alternate rabble shafts of a length substantially less than the radius of the roasting chambers and arms of a shorter length on the intermediate rabble shafts.

13. In a circular or approximately circular furnace as claimed in claim 1, a stationary air circulating column independent of the rabbling mechanism disposed vertically in the center of the furnace, and rabble arms on the symmetrically arranged rabble shafts adapted to clear the said column.

14. In a circular or approximately circular furnace as claimed in claim 1, a vertical column disposed centrally in the furnace, means for supplying air or other gas to the column, ports in the side of the column, arranged in communication with one or more of the roasting chambers and means for controlling the flow of air through the said ports.

15. In a circular or approximately circular furnace as claimed in claim 1, an air circulating column disposed centrally within the furnace, and muffles in one or more roasting chambers arranged in communication with the said central column.

16. In a circular or approximately circular furnace as claimed in claim 1, means located within the furnace for preheating roasting air and means for delivering the preheated air to one or more of the lower roasting chambers whereby control of the temperature of the roasting chambers is effected.

17. In a circular or approximately circular furnace as claimed in claim 1, a column passing vertically through the centre of the furnace, muffles extending radially from the central column and arranged in communication therewith, means for passing cool air from the central column through the muffles and back to the said column and means for passing the air heated by the muffles to another part of the furnace.

18. In a circular or approximately circular furnace as claimed in claim 1, a column supported centrally within the furnace, muffle arms fitted detachably to the column and extending radially therefrom, means for supporting the muffle arms adjacent the crown of the roasting chambers, an air supply pipe within the column having distributing pipes projecting into the muffle arms, and outlets for the heated air from the lower part of the central column whereby the air returned to the central column through the muffle arms will be directed into one of the lowermost roasting chambers.

19. In a circular or approximately circular furnace as claimed in claim 1, a column supported centrally within the furnace, a partition disposed longitudinally within the column, ports in the column on opposite sides of the partition therein, a muffle in one or more hearths of the roasting chambers, a radial partition in the muffle aligning with the partition in the column, and radial division walls forming passages on both sides of the radial partition and communicating with the ports in the central column.

In testimony whereof I have affixed my signature in presence of two witnesses.

ARTHUR VICTOR LEGGO.

Witnesses:
WM. A. HAIK,
JOHN M. VEBBER.